(12) United States Patent
Shiraki

(10) Patent No.: US 9,185,076 B2
(45) Date of Patent: Nov. 10, 2015

(54) PACKET PROCESSING APPARATUS, NETWORK EQUIPMENT AND PACKET PROCESSING METHOD

(75) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 922 days.

(21) Appl. No.: 12/619,500

(22) Filed: Nov. 16, 2009

(65) Prior Publication Data

US 2010/0128736 A1   May 27, 2010

(30) Foreign Application Priority Data

Nov. 27, 2008 (JP) ................................ 2008-301987

(51) Int. Cl.
*H04L 29/06* (2006.01)
*H04L 12/721* (2013.01)

(52) U.S. Cl.
CPC ............ *H04L 63/0227* (2013.01); *H04L 69/22* (2013.01); *H04L 29/06925* (2013.01); *H04L 45/32* (2013.01); *H04L 63/1458* (2013.01); *H04L 2463/141* (2013.01); *H04L 2463/142* (2013.01); *H04L 2463/143* (2013.01); *H04L 2463/144* (2013.01); *H04L 2463/145* (2013.01)

(58) Field of Classification Search
None
See application file for complete search history.

(56) References Cited

U.S. PATENT DOCUMENTS 7,266,754 B2 * 9/2007 Shah et al. .................... 714/776
8,566,444 B1 * 10/2013 Yona .............................. 709/225

| | | | |
|---|---|---|---|
| 2005/0182950 A1 | 8/2005 | Son et al. | |
| 2005/0286517 A1 | 12/2005 | Babbar et al. | |
| 2008/0212597 A1 * | 9/2008 | Baryshnikov et al. | 370/408 |
| 2008/0262991 A1 * | 10/2008 | Kapoor et al. | 706/20 |
| 2009/0300759 A1 * | 12/2009 | Wang et al. | 726/22 |

FOREIGN PATENT DOCUMENTS

| | | |
|---|---|---|
| JP | 08-18599 | 1/1996 |
| JP | 2005-229573 | 8/2005 |
| JP | 2006-254134 | 9/2006 |

OTHER PUBLICATIONS

Office Action issued Aug. 21, 2012 in corresponding Japanese Patent Application No. 2008-301987 (5 pages) (3 pages English translation).
Japanese Office Action mailed Mar. 19, 2013 in corresponding Japanese Patent Application No. 2008-301987 (10 pages) (English Translation 5 pages).

* cited by examiner

*Primary Examiner* — Jae Y Lee
*Assistant Examiner* — Andrew Oh
(74) *Attorney, Agent, or Firm* — Staas & Halsey LLP

(57) ABSTRACT

A packet processing apparatus includes a static pattern matcher comparing pattern information defining a packet to be filtered with a value regarding at least a part of a received packet, the pattern information being stored by a pattern information manager. A frequency calculator calculates the frequency of matching by the static pattern matcher. A dynamic pattern matcher matches the frequency and a preset comparison value and a processing determiner determines a processing on the received packet based upon the dynamic pattern match.

15 Claims, 19 Drawing Sheets

FIG. 3

| | SA | DA | VID | FREQUENCY | COMPARISON METHOD | COMPARISON VALUE |
|---|---|---|---|---|---|---|
| ENTRY 0 | ... | ... | ... | ... | 0 : > | 100 |
| ENTRY 1 | ... | ... | ... | ... | 1 : = | 50 |
| ENTRY 2 | ... | ... | ... | ... | 2 : < | 20 |
| ENTRY 3 | ... | ... | ... | ... | 0 : > | 70 |
| ENTRY 4 | | | | | | |
| ENTRY 5 | | | | | | |

STATIC PATTERN: SA, DA, VID
DYNAMIC PATTERN: FREQUENCY, COMPARISON METHOD, COMPARISON VALUE

| | AUTOMATIC REGISTRATION FLAG | AUTOMATIC DELETION FLAG | SA | DA | VID | FREQUENCY | COMPARISON METHOD | COMPARISON VALUE |
|---|---|---|---|---|---|---|---|---|
| ENTRY 0 | | | ... | ... | ... | ... | 0 : > | 100 |
| ENTRY 1 | | | ... | ... | ... | ... | 1 : = | 50 |
| ENTRY 2 | | | ... | ... | ... | ... | 2 : < | 20 |
| ENTRY 3 | | | ... | ... | ... | ... | 0 : > | 70 |
| ENTRY 4 | | | | | | | | |
| ENTRY 5 | | | | | | | | |

31

STATIC PATTERN (SA, DA, VID columns)
DYNAMIC PATTERN (FREQUENCY, COMPARISON METHOD, COMPARISON VALUE columns)

PACKET PROCESSING APPARATUS, NETWORK EQUIPMENT AND PACKET PROCESSING METHOD

CROSS-REFERENCE TO RELATED APPLICATIONS

This application is based upon and claims the benefit of priority of the prior Japanese Patent Application No. 2008-301987, filed on Nov. 27, 2008, the entire contents of which are incorporated herein by reference.

FIELD

The embodiment discussed herein is related to packet processing apparatus, network equipment and packet processing methods for filtering packets.

BACKGROUND

Network equipment such as a router and a switch generally has a packet filtering function. The filtering function is a function mainly limiting the circulation or changing the destination of packets matching a condition for filtering, which is predefined in an ACL (Access Control List).

The filtering function may be implemented in software or hardware. Filtering functions implemented in software (as disclosed in JP-T-2008-505561 or JP-A-8-18599, for example) have high flexibility while disadvantageously having a low processing speed. Therefore, the implementation in hardware is more suitable for processing a large number of packets at a high speed.

SUMMARY

According to an aspect of the invention, a packet processing apparatus includes a static pattern matching unit that compares pattern information defining a packet to be filtered with a value regarding at least a part of the packet, which is stored by a pattern information managing unit and a packet received by network equipment; a frequency calculating unit that calculates the frequency of matching by the static pattern matching unit; a dynamic pattern matching unit that compares the frequency and a preset comparison value and outputs the comparison result; and a processing determining unit that determines processing on the packet on the basis of the comparison result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram depicting a configuration example of an ACL table.

FIG. 19 is a diagram depicting a second configuration example of the ACL table.

DETAILED DESCRIPTION OF EMBODIMENT(S)

Implementing a filtering function in hardware has had following problems.

First of all, because a condition for filtering is given as static information, it has been difficult to change the behaviors in accordance with dynamic information such as an amount of traffic. In order to change the behaviors in accordance with a given amount of traffic, software processing may be required therebetween. Therefore, it is difficult to acquire the performance demanded.

Second, special hardware may be required for a specific DoS (Denial of Services) detection function and/or a specific QoS (Quality of Service) function. The special hardware increases the costs. Furthermore, because the special hardware implements a method for extracting information required for control in a hard-wired manner, it is difficult to flexibly address unknown risks and/or new requirements.

The invention was made in consideration of the points, and it is an object of one aspect of the invention to provide a packet processing apparatus, network equipment, and a packet processing method, which can improve the flexibility of a filtering function for packets in hardware.

Figure 1:
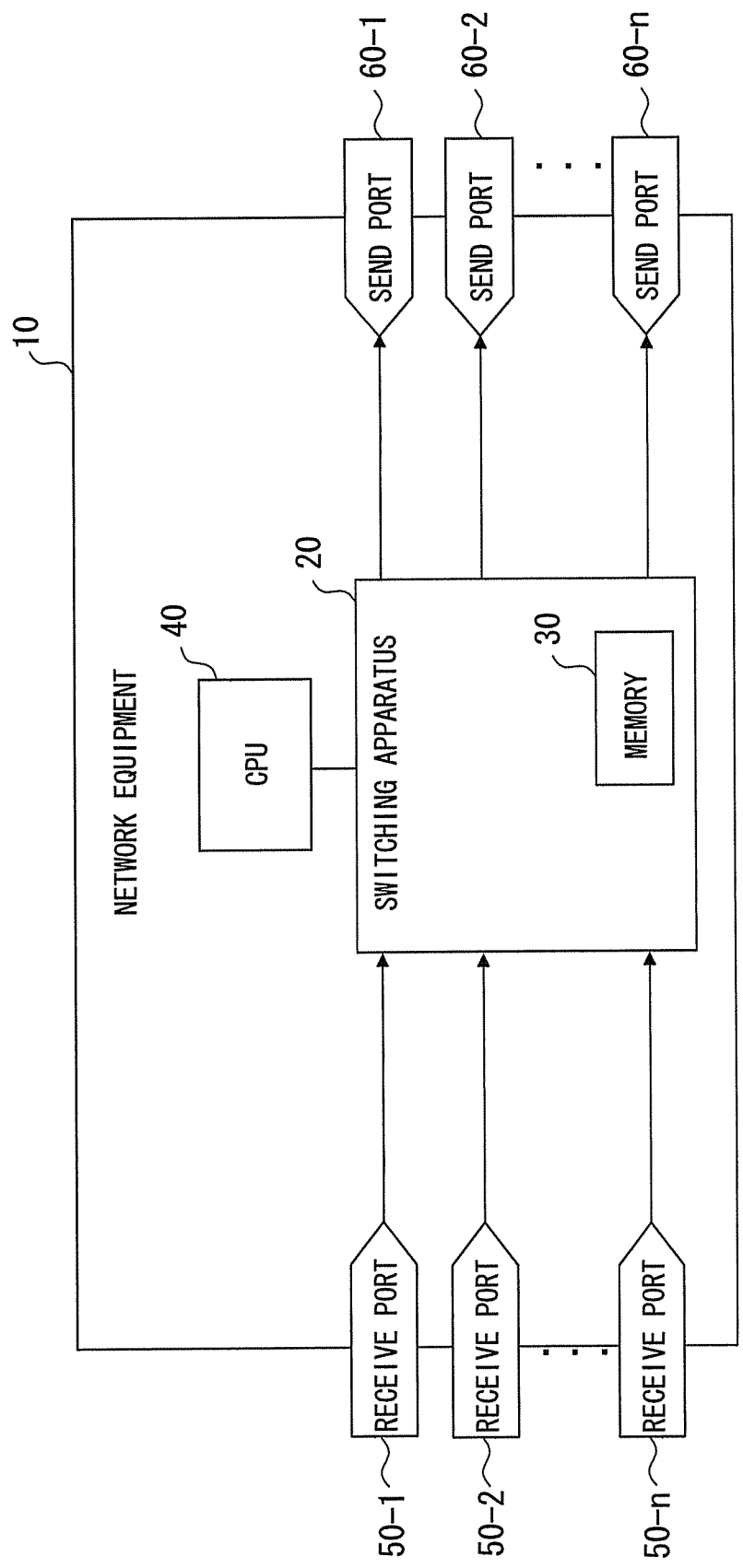
FIG. 1 is a diagram depicting a hardware configuration example of network equipment according to an embodiment of the invention.

With reference to drawings, embodiments of the invention will be described below. FIG. 1 is a diagram depicting a hardware configuration example of network equipment according to an embodiment of the invention. In FIG. 1, special hardware network equipment 10 is a path control unit or a relay unit such as a router or a switch and includes a switching apparatus 20, a CPU 40, receive ports 50-1 to n (which will collectively be called "receive ports 50" hereinafter), and send ports 60-1 to n (which will collectively be called "send ports 60" hereinafter).

Each of the receive ports 50 is an interface for connecting to a network on the input side and receives a packet over the network.

The switching apparatus 20 is an apparatus (or a packet processing apparatus) having a filtering function for packets received by the receive ports 50. The switching apparatus 20 has a memory 30. The memory 30 stores data required for filtering packets. Notably, the switching apparatus 20 may be implemented on a chip.

Each of the send ports 60 is an interface for connecting to a network on the output side and transmits packets, which are permitted to pass through by the switching apparatus 20.

The CPU 40 controls operations by the entire network equipment 10. In FIG. 1, less important hardware in the description on this embodiment is omitted.

Figure 2:
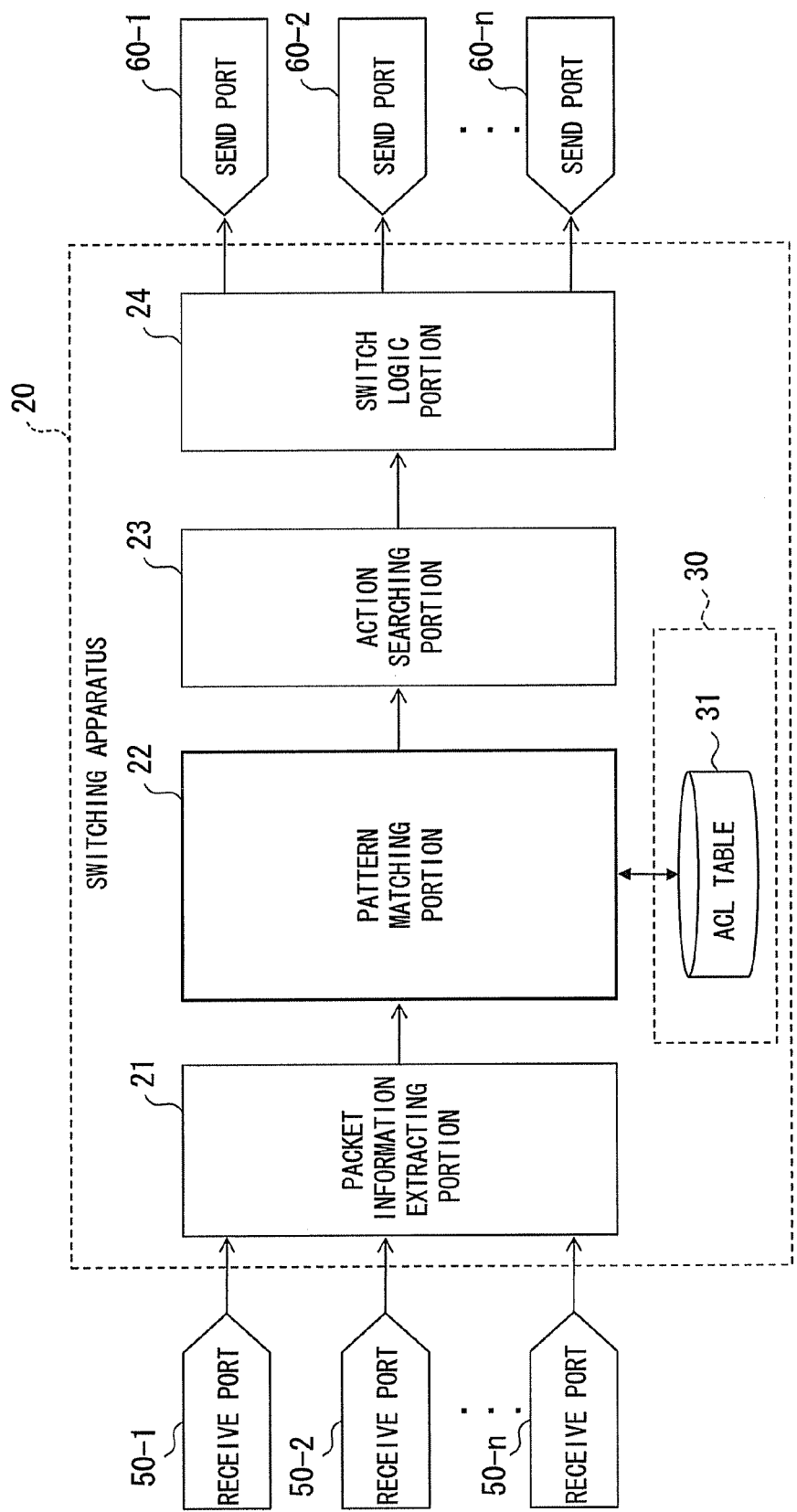
FIG. 2 is a diagram depicting a configuration example of a switching apparatus.

The switching apparatus 20 will be described in further details. FIG. 2 is a diagram depicting a configuration example of the switching apparatus. In FIG. 2, the switching apparatus 20 has a packet information extracting portion 21, a pattern matching portion 22, an action searching portion 23, a switch logic portion 24, and the like.

The packet information extracting portion 21 is a circuit that extracts information required for matching a condition (which is pattern information) for filtering from received packets (which will be called receive packets). According to this embodiment, an example will be described in which the pattern information is defined in accordance with the values of the source MAC address (SA), destination MAC address (DA) and VLAN ID (VID). However, the information included in a packet, which is to be used for defining the pattern information, may be selected as required.

The pattern matching portion 22 is a circuit that compares the information (which will be called extracted information) which is extracted by the packet information extracting portion 21 with pattern information (which is an ACL (Access Control List)) registered with an ACL table 31 and outputs the matching result (that is, whether it matches the pattern or not) to the action searching portion 23.

FIG. 3 is a diagram depicting a configuration example of the ACL table. In FIG. 3, the ACL table 31 has items of SA (source MAC address), DA (destination MAC address), VID (VLAN ID), frequency, comparison method, comparison (threshold) value, and the like.

The entries prestore at least one value of the SA, DA and VID. If a packet is received, the values of the SA, DA and VID of the receive packet and the value or values of SA, DA and VID in the entries are compared. Notably, the SA, DA and VID are prestored static pattern information. Therefore, the SA, DA and VID on the ACL table 31 will be called static pattern in the following description.

The frequency refers to a frequency of the detection of receive packets matching the static pattern within a predetermined period of time. The comparison value refers to a value to be compared with the value of the frequency. The comparison method refers to a method for comparing between the value of the frequency and the comparison value, namely comparison methods of an equal sign or an inequality sign comparison and as illustrated in FIG. 3, a comparison method can be identified by an integer value (one of 0 to 3) corresponding to the comparison methods of an equal sign or an inequality sign. The frequency is a value that dynamically varies in accordance with the reception of packets or with a lapse of time. Thus, the comparison result between the frequency and the comparison value dynamically varies. Therefore, the frequency, comparison method and comparison value on the ACL table 31 will be called a dynamic pattern in the following description.

The ACL table 31 is stored in the memory 30.

Referring back to FIG. 2, the action searching portion 23 is a circuit that determines the processing to be performed on a given receive packet in accordance with the matching result by the pattern matching portion 22.

The switch logic portion 24 performs the processing in accordance with the determination result by the action searching portion 23 on a receive packet. For example, the packet permitted to pass through is sent by the send port 60.

Among the components described above, the pattern matching portion 22 will be described in details according to different embodiments in this embodiment.

Figure 4:
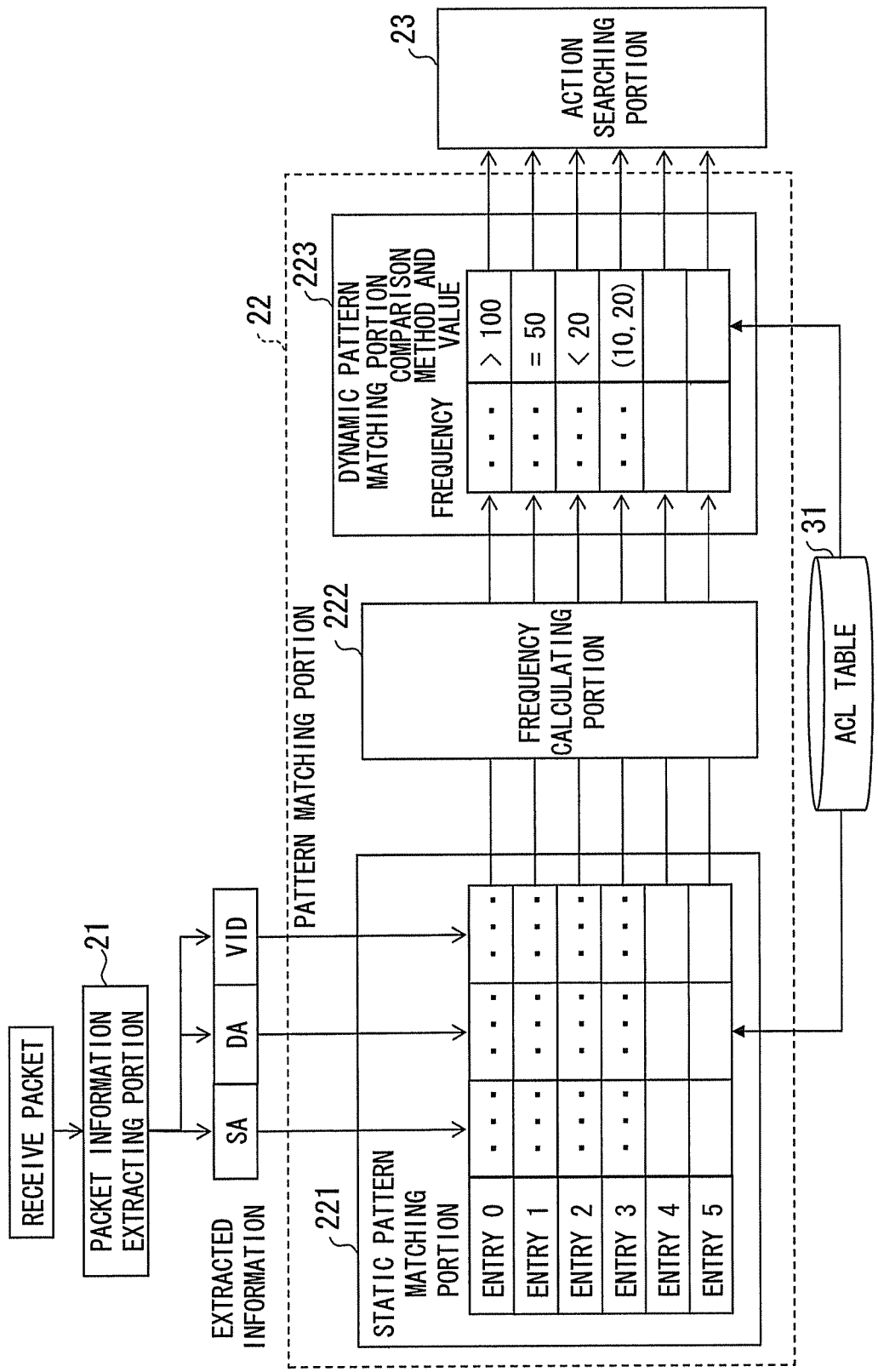
FIG. 4 is a diagram depicting a configuration example of a pattern matching portion according to a first embodiment.

FIG. 4 is a diagram depicting a configuration example of the pattern matching portion according to a first embodiment. In FIG. 4, the pattern matching portion 22 has a static pattern matching portion 221, a frequency calculating portion 222, a dynamic pattern matching portion 223, and the like.

The static pattern matching portion 221 compares the static patterns (SA, DA and VID) of the entries on the ACL table 31 and the information (SA, DA and VID) extracted from a receive packet. The static pattern matching portion 221 outputs a signal indicating "1 (matched)" or "0 (unmatched)" as the matching result to the frequency calculating portion 222 for each of the entries.

For each of the entries, the frequency calculating portion 221 calculates the frequency of matching the static pattern and registers the calculation result with the "frequency" on the ACL table 31.

The dynamic pattern matching portion 223 compares the frequency and the comparison value for each of the entries on the ACL table 31. The dynamic pattern matching portion 223 outputs, for each of the entries, "1" if the comparison result is true (or matches the condition) or "0" if it is false (or does not match the condition). The output information by the dynamic pattern matching portion 223 is the input information to the action searching portion 23. In the example in FIG. 4, the matching is performed on six entries. Therefore, 6-bit information is input to the action searching portion 23. Notably, for an entry without any registered pattern information (which is Entry 4 and Entry 5 in FIG. 4), "0" is output as the tching result.

Figure 5:
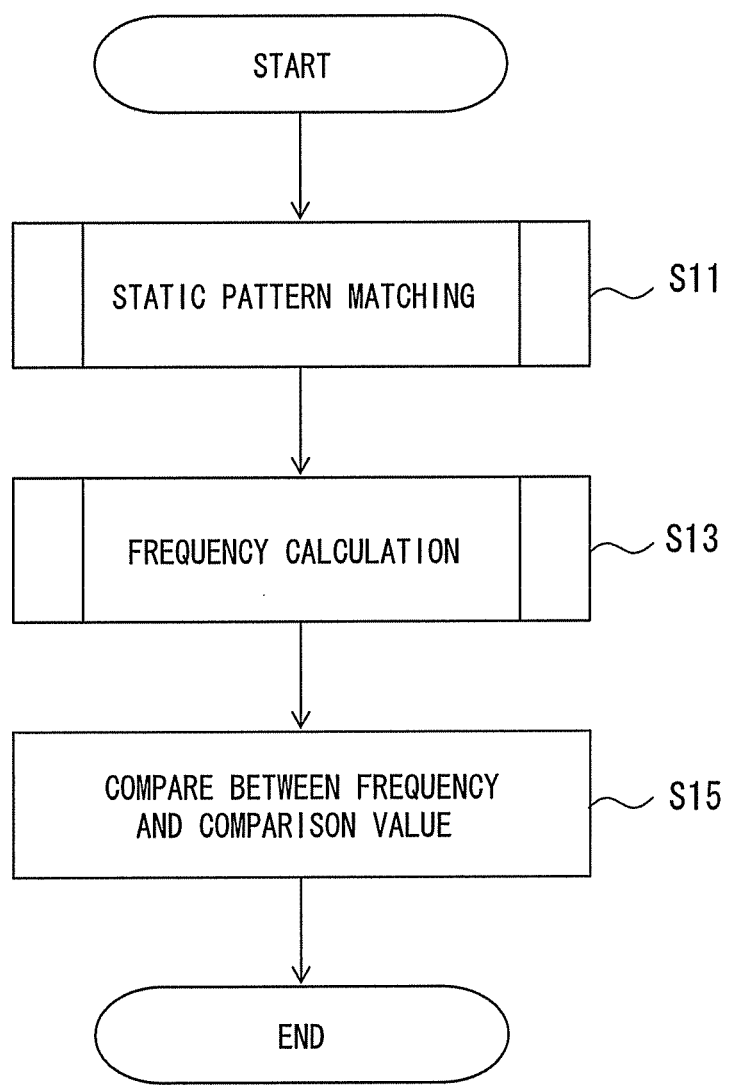
FIG. 5 is a flowchart for describing operations by the pattern matching portion according to the first embodiment.

The processing routine by the pattern matching portion 22 will be described below. FIG. 5 is a flowchart for describing operations by the pattern matching portion according to the first embodiment.

If the extracted information from the receive packet is input by the packet information extracting portion 21, the static pattern matching portion 221 compares the static patterns on the ACL table 31 and the extracted information (S11).

Then, the frequency calculating portion 222 calculates the frequency of matching between the static patterns and the extracted information on the basis of the matching result by the static pattern matching portion 221 and updates the ACL table 31 on the basis of the calculation result (S13).

Then, for each of the entries on the ACL table 31, the dynamic pattern matching portion 223 compares the frequency and the comparison value on the basis of the comparison method and outputs the comparison result (1 or 0) (S15).

Figure 6:
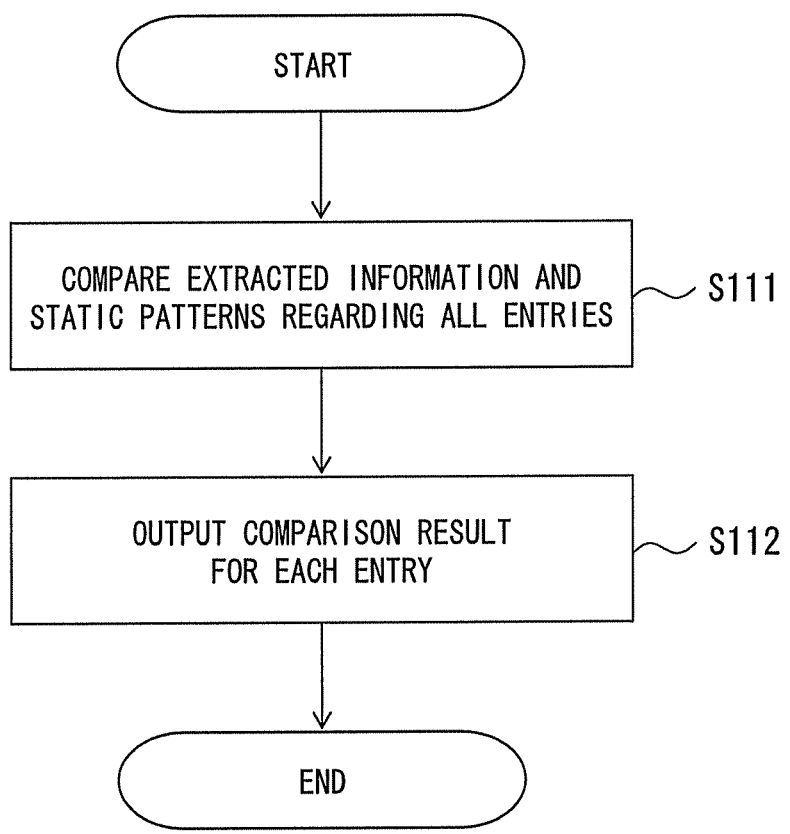
FIG. 6 is a flowchart for describing operations by a static pattern matching portion.

Next, details of S11 will be described. FIG. 6 is a flowchart for describing operations by the static pattern matching portion.

For the entries on the ACL table 31, the input extracted information is compared with the static patterns (S111). The comparisons may be performed in parallel or sequentially.

Then, the matching result (1 or 0) for each of the entries is output to the frequency calculating portion 222 (S112).

Figure 7:
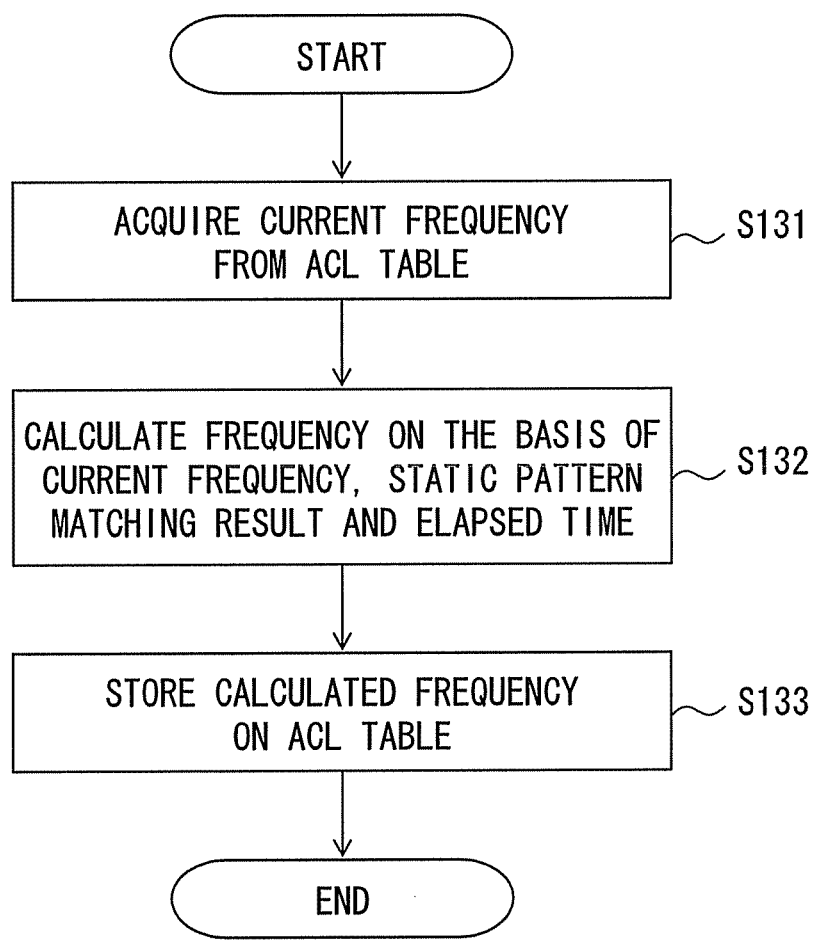
FIG. 7 is a flowchart for describing operations by a frequency calculating portion.

Next, details of S13 in FIG. 5 will be described. FIG. 7 is a flowchart for describing operations by the frequency calculating portion.

In accordance with the input of the matching results from the static pattern matching portion 221, the current frequency is acquired from each of the entries on the ACL table 31 (S131). Then, on the basis of the current frequency, the matching results from the static pattern matching portion 221 and the elapsed time, for example, the frequency of matching the static pattern is calculated for each of the entries (S132). Then, the calculated frequency (which may be called matching frequency) is registered with the corresponding entry, whereby the ACL table 31 is updated (S133).

Figure 8:
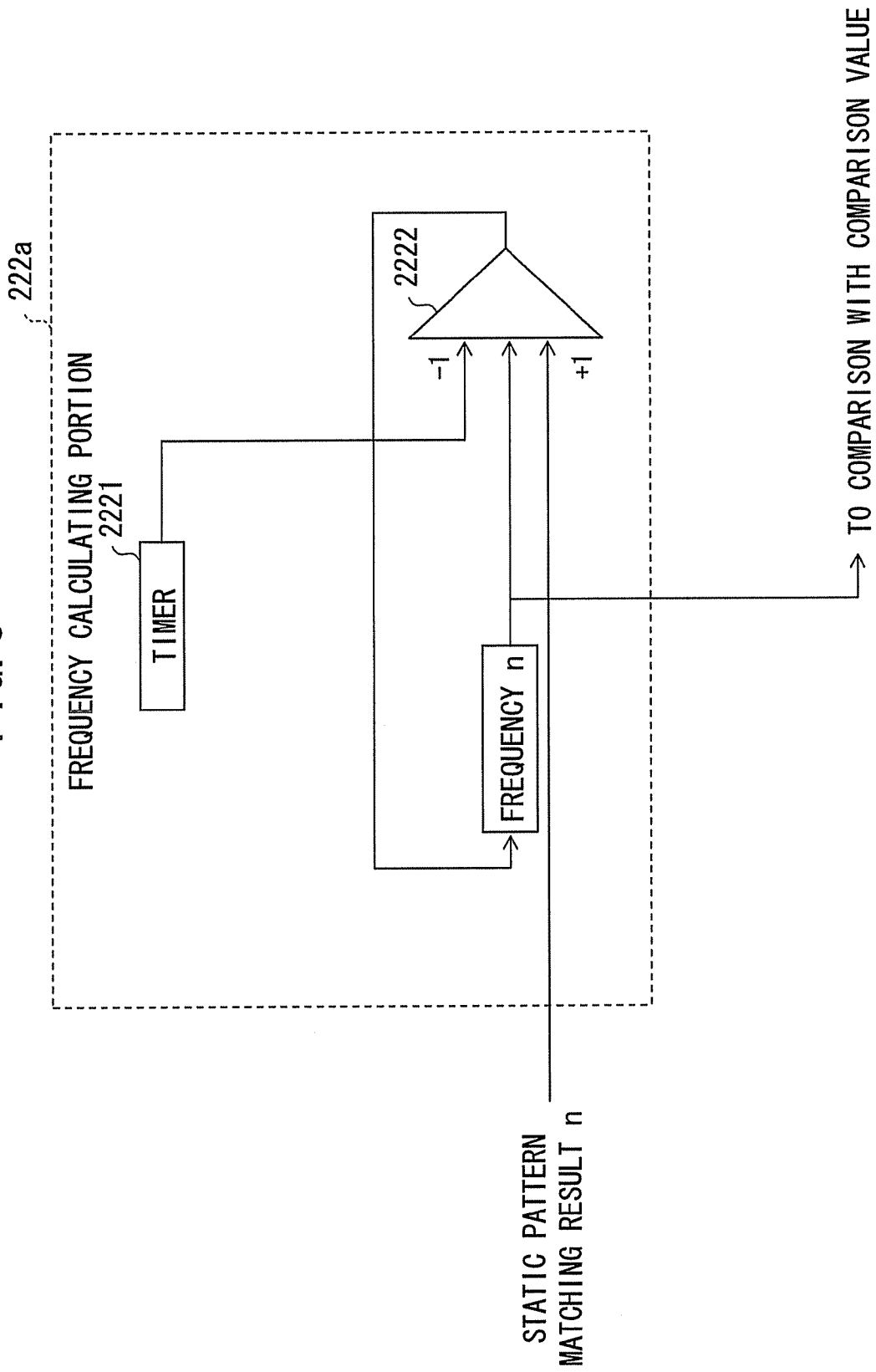
FIG. 8 is a diagram depicting a first configuration example of the frequency calculating portion.

Next, details of the frequency calculating portion 222 will be described. FIG. 8 is a diagram depicting a first configuration example of the frequency calculating portion.

In FIG. 8, a frequency calculating portion 222a has a timer 2221 and an adder 2222. The timer 2221 generates a subtraction control pulse periodically (at predetermined periods of time). If the adder 2222 receives the input of "1" as the matching result (static pattern matching result n) regarding the static pattern of the nth entry, the adder 2222 adds 1 to the frequency (frequency n) in the nth entry on the ACL table 31. If the timer 2221 generates the subtraction control pulse, 1 is subtracted from the frequency n. The frequency calculating portion 222a cumulatively calculates the frequency from the start of the calculation of the frequencies to a certain point in time.

Figure 9:
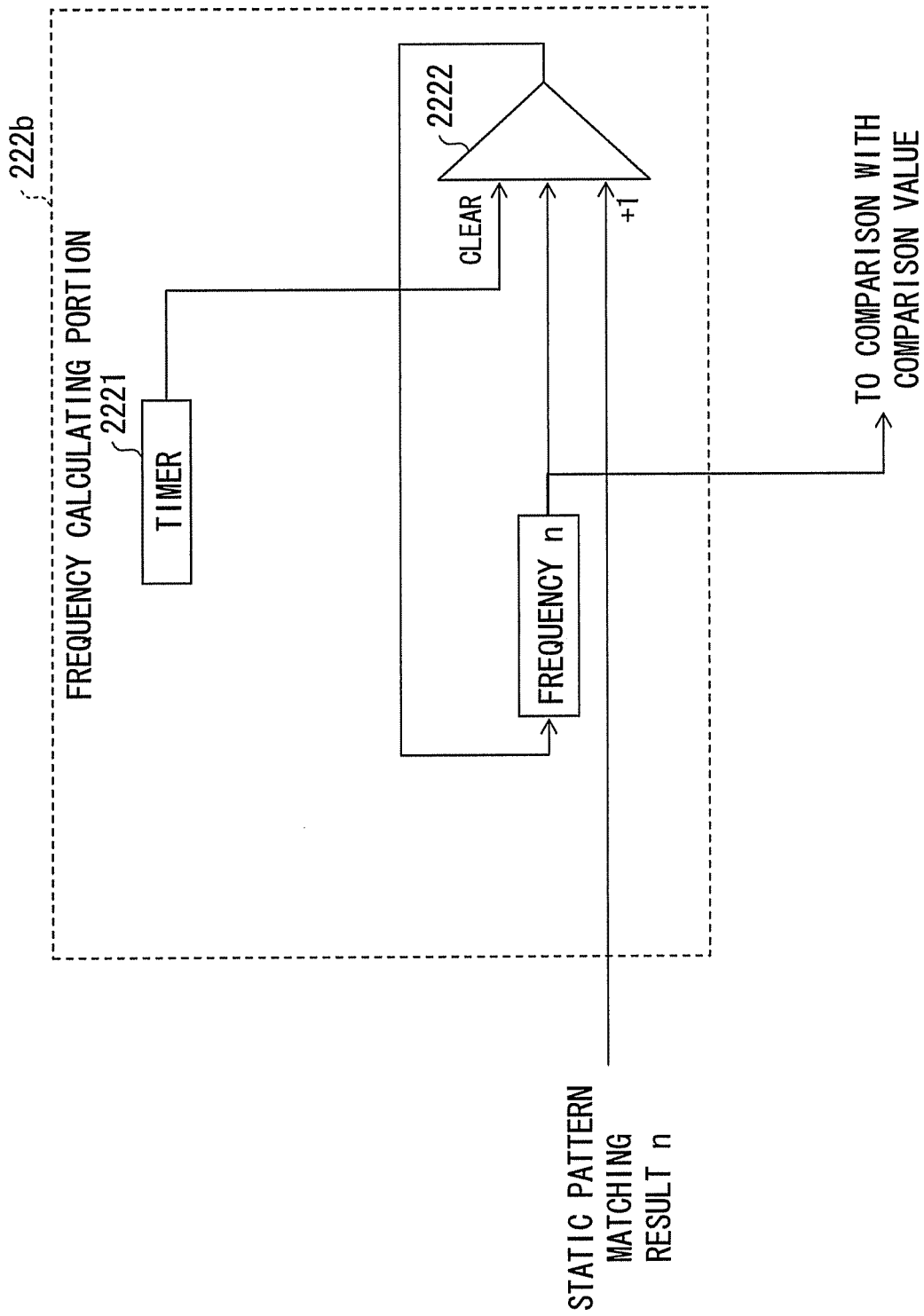
FIG. 9 is a diagram depicting a second configuration example of the frequency calculating portion.

Next, FIG. 9 is a diagram depicting a second configuration example of the frequency calculating portion. In FIG. 9, the same reference numerals are given to the same parts as those in FIG. 8, and the description thereon will be omitted herein.

In a frequency calculating portion 222b in FIG. 9, the timer 2221 periodically generates a clear control pulse. If the timer 2221 generates the clear control pulse, the adder 2222 clears the value of the frequency n (or changes it to 0). The frequency calculating portion 222b initializes the frequency at predetermined periods of time.

Figure 10:
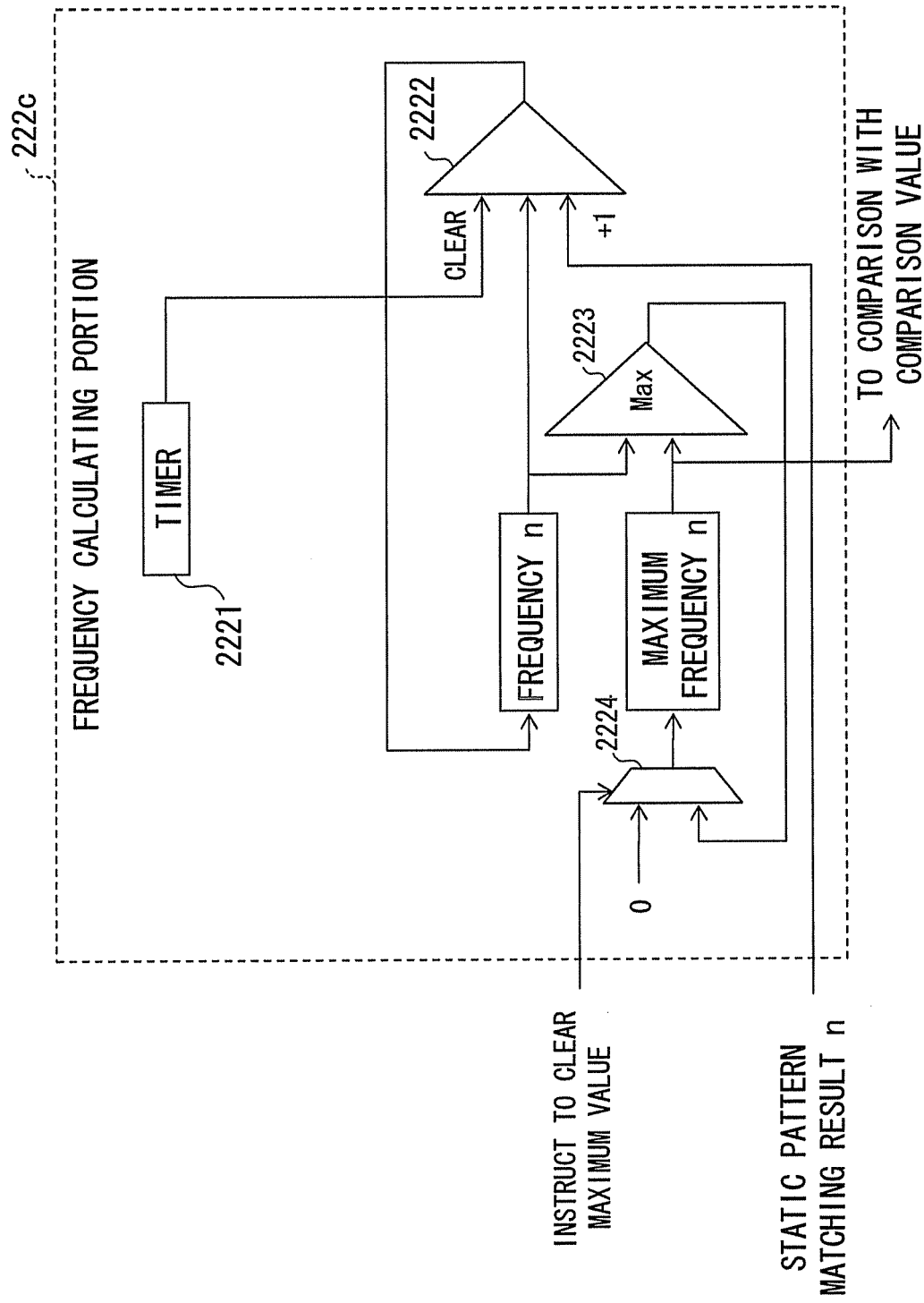
FIG. 10 is a diagram depicting a third configuration example of the frequency calculating portion.

Next, FIG. 10 is a diagram depicting a third configuration example of the frequency calculating portion. In FIG. 10, the same reference numerals are given to the same parts as those in FIG. 9, and the description thereon will be omitted herein.

The frequency calculating portion 222c in FIG. 10 has a maximum value output device 2223 and a selector 2224. The maximum value output device 2223 compares the frequency n output from the adder 2222 and a maximum value of the frequencies n up to that point (which will be called maximum frequency n) and outputs the higher one. The value output from the maximum value output device 2223 is held as the maximum frequency n and is used for the comparison with the comparison value. If the selector 2224 receives the input of a clear instruction on the maximum frequency, which is input from the CPU 40 in accordance with an operation by a user, for example, the selector 2224 initializes the maximum frequency n.

The frequency calculating portion 222c can stabilize the value of the frequency to be used for the comparison with the dynamic pattern. Thus, when, for example, a DoS (Denial of Services) attack is detected and a packet is blocked therefor, the block state can be kept until the user can verify the safety and the maximum frequency clear instruction is input thereto. In FIG. 10, the timer 2221 may generate a subtraction control pulse instead of the clear control pulse.

By the way, in the examples depicted in FIG. 8 to FIG. 10, the frequency calculating portion 222a, 222b or 222c is required for each of the entries on the ACL table 31. For example, for six entries, six frequency calculating portions 222a, 222b or 222c are required. Now, a fourth example will be described which is an example that reduces the hardware costs.

Figure 11:
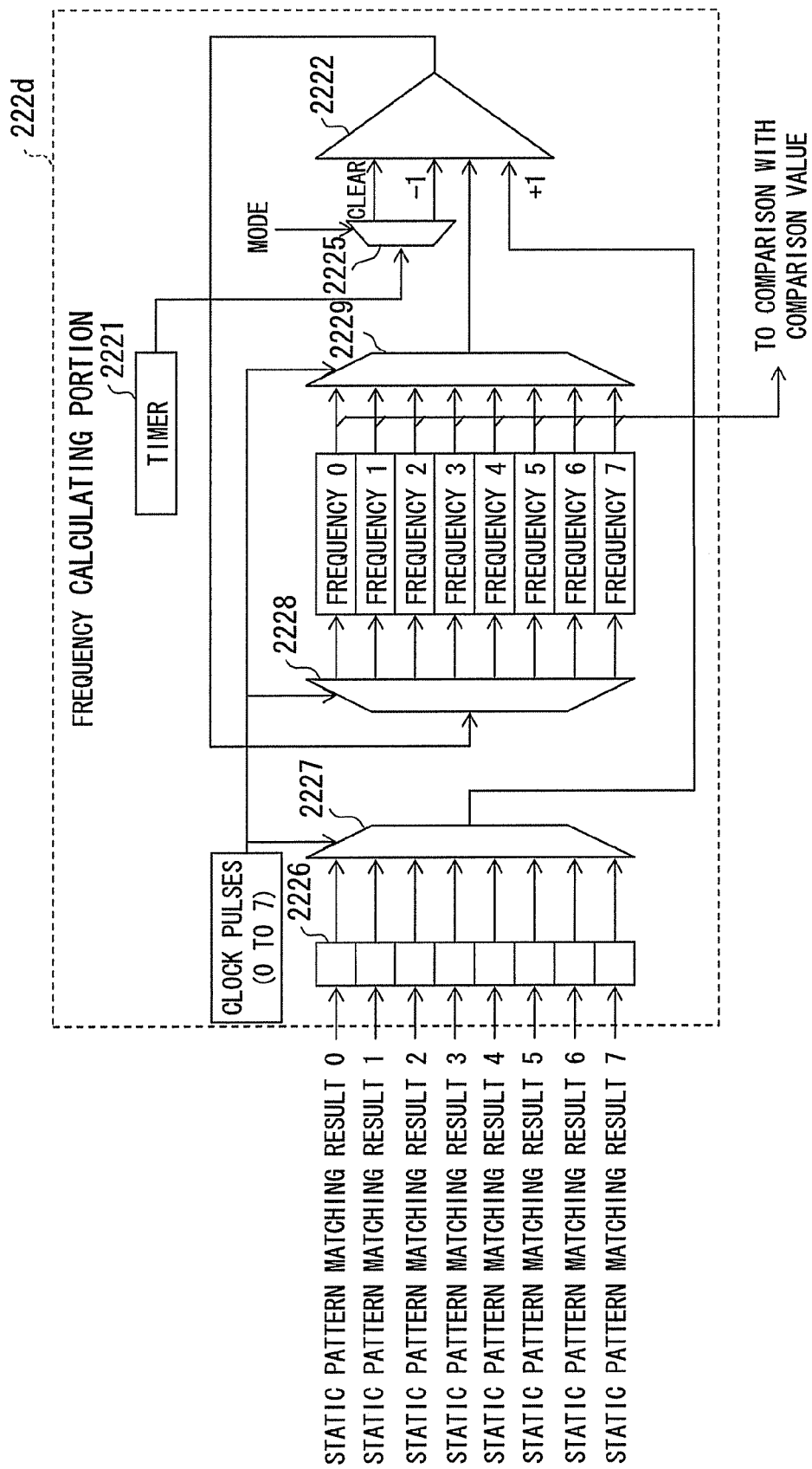
FIG. 11 is a diagram depicting a fourth configuration example of the frequency calculating portion.

FIG. 11 is a diagram depicting the fourth configuration example of the frequency calculating portion. In FIG. 11, the same reference numerals are given to the same parts as those in FIG. 8 or 9, and the description thereon will be omitted herein.

The frequency calculating portion 222d in FIG. 11 has a selector 2225, a static-pattern-matching-result holding portion 2226, a selector 2227, a selector 2228, a selector 2229, and the like.

The selector 2225 receives the input of a pulse from the timer 2221 and outputs a subtraction control pulse or a clear control pulse in accordance with the value of the mode defined by a user. The selector 2225 allows the frequency calculating portion 222d to select the frequency calculation method of either frequency calculating portion 222a or 222b.

The static-pattern-matching-result holding portion 2226 temporarily holds the static pattern matching result for each entry. FIG. 11 depicts an example in which eight entries 0 to 7 exist.

In accordance with a clock pulse from the switching apparatus 20, the selector 2227 sequentially (or successively) acquires the static pattern matching result for the nth entry held in the static-pattern-matching-result holding portion 2226 and inputs the acquired value to the adder 2222.

In accordance with the clock pulse, the selector 2229 sequentially acquires the frequency for the nth entry held on the ACL table 31 and inputs the acquired value to the adder 2222.

Thus, the adder 2222 sequentially adds the frequency for the nth entry.

In accordance with the clock pulse, the selector 2228 sequentially selects the entry (which is an entry on the ACL table 31) to register the value output by the adder 2222.

Because the frequency calculating portion 222d sequentially calculates the frequency for the corresponding entry, a common circuit may be implemented to the entries. As a result, the hardware costs can be reduced. Notably, because the packet arrival period is longer than the period for the entries (which are equal to 8 clock pulses in FIG. 11), the sequential frequency calculation does not deteriorate the performance.

As described above, the network equipment 10 according to the first embodiment allows filtering by using the frequency the value of which dynamically varies. Therefore, the flexibility of the packet filtering function can be improved. As a result, the processing against a DoS attack or the distribution of network loads, for example, can be dynamically performed.

Figure 12:
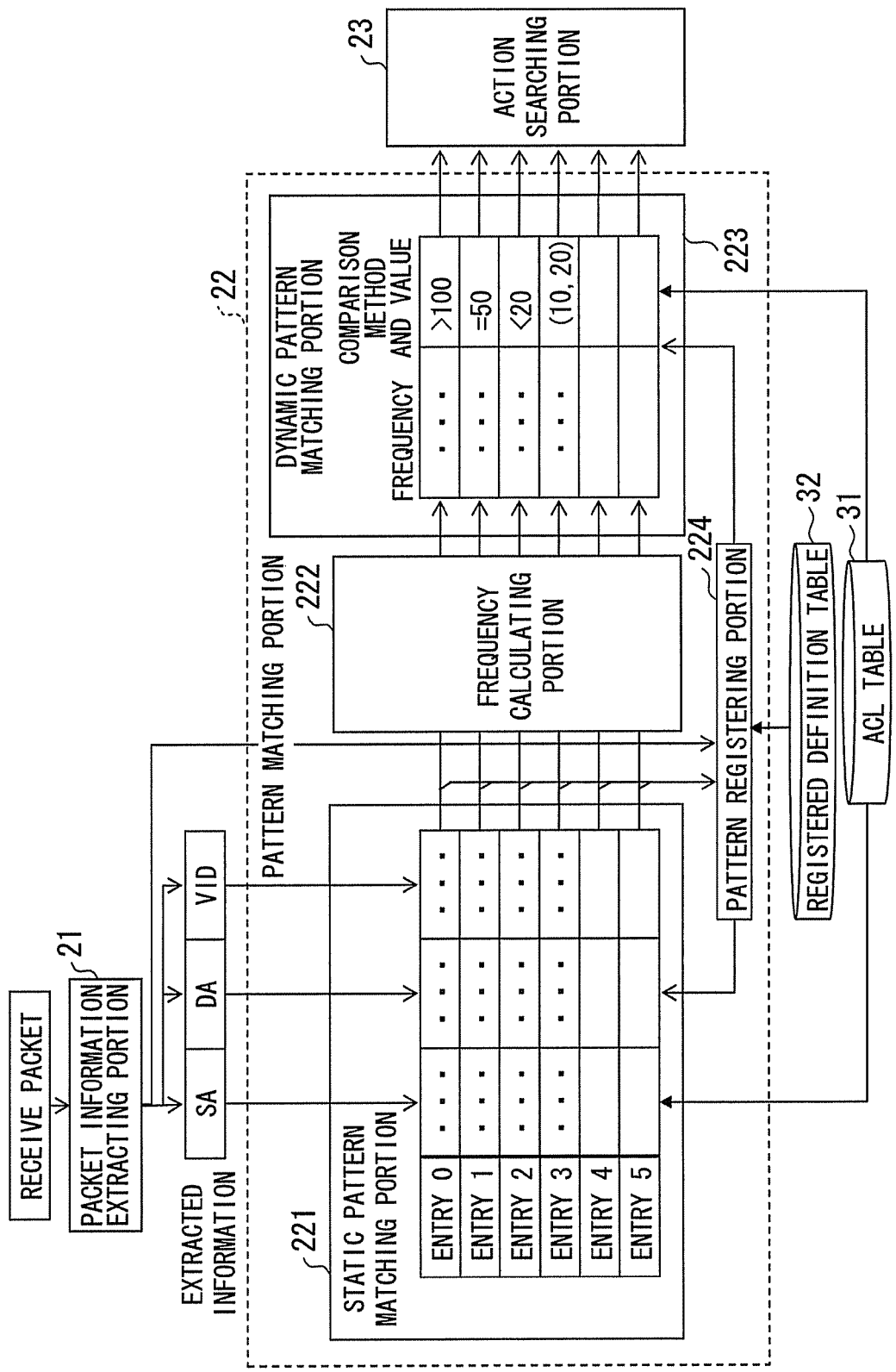
FIG. 12 is a diagram depicting a configuration example of a pattern matching portion according to a second embodiment.

Next, a second embodiment will be described. FIG. 12 is a diagram depicting a configuration example of the pattern matching portion according to the second embodiment. In FIG. 12, the same reference numerals are given to the same parts as those in FIG. 4, and the description thereon will be omitted herein. The points which are not particularly referred according to the second embodiment may be similar to those in the first embodiment.

Referring to FIG. 12, the pattern matching portion 22 has a pattern registering portion 224. The pattern registering portion 224 registers new pattern information with the ACL table 31 if there are no static patterns matching the extracted information (or if the matching results on all entries by the static pattern matching portion 221 are 0). The details of the pattern information to be newly registered depend on the definition on a registered definition table 32. The registered definition table 32 is information prestored in the memory 30. According to an aspect of an embodiment, a determination of no static pattern matching may be according to any number of one or a plurality of successive no static pattern matches, a set of successive no static pattern matches according to a number of entries into the switching apparatus, a set of non-consecutive, or non-sequential, no static pattern matches or a combination of same and/or varying such sets, a number of no static pattern matches within a period of time, or any combinations thereof.

Figure 13:
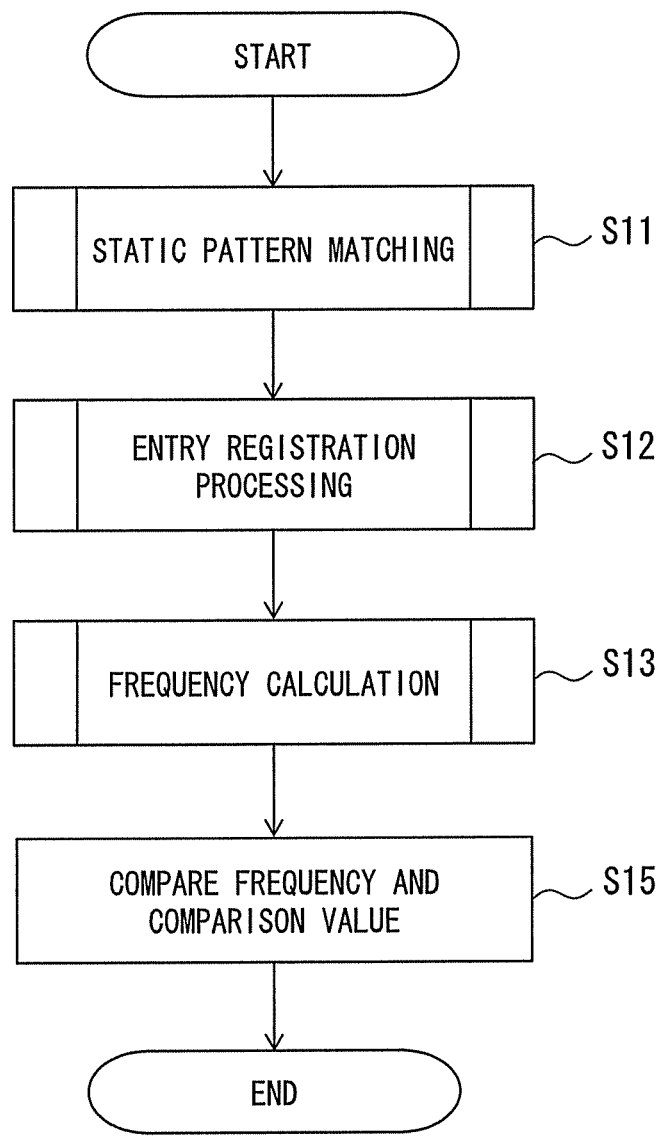
FIG. 13 is a flowchart for describing operations by the pattern matching portion according to the second embodiment.

FIG. 13 is a flowchart for describing operations by the pattern matching portion according to the second embodiment. In FIG. 13, the same operation numerals are given to the same operations as those in FIG. 5, and the description thereon will be omitted herein.

According to the second embodiment, S12 is added. In S12, the pattern registering portion 224 performs processing for registering new pattern information with the ACL table 31.

Figure 14:
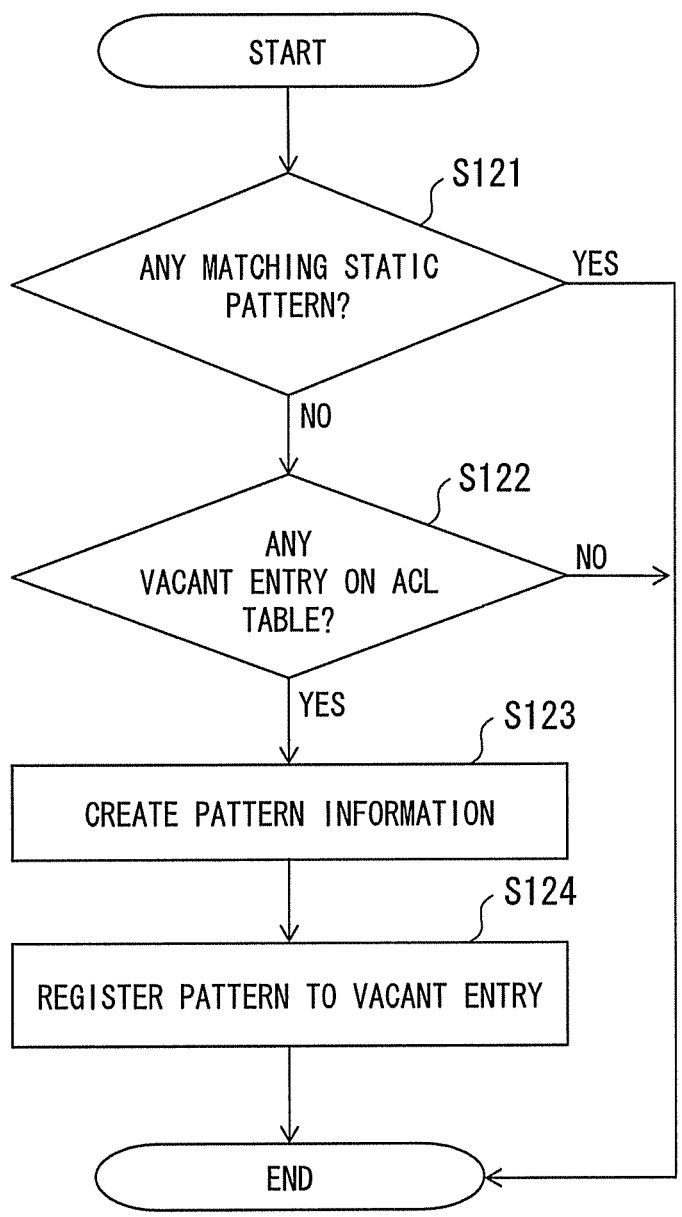
FIG. 14 is a flowchart for describing operations by a pattern registering portion.

The details of S12 will be described. FIG. 14 is a flowchart for describing operations by the pattern registering portion.

First of all, on the basis of the matching result output from the static pattern matching portion 221, whether any static pattern matches the extracted information or not is determined (S121). If no static patterns match (No in S121), whether ACL table 31 has any vacant entry (which is an entry without pattern information) or not is checked (S122). If a vacant entry exists (Yes in S122), the pattern information to be newly registered is created on the basis of the extracted information and registered definition table 32, for example (S123). Then, the created pattern information is registered with the vacant entry (S124).

Figure 15:
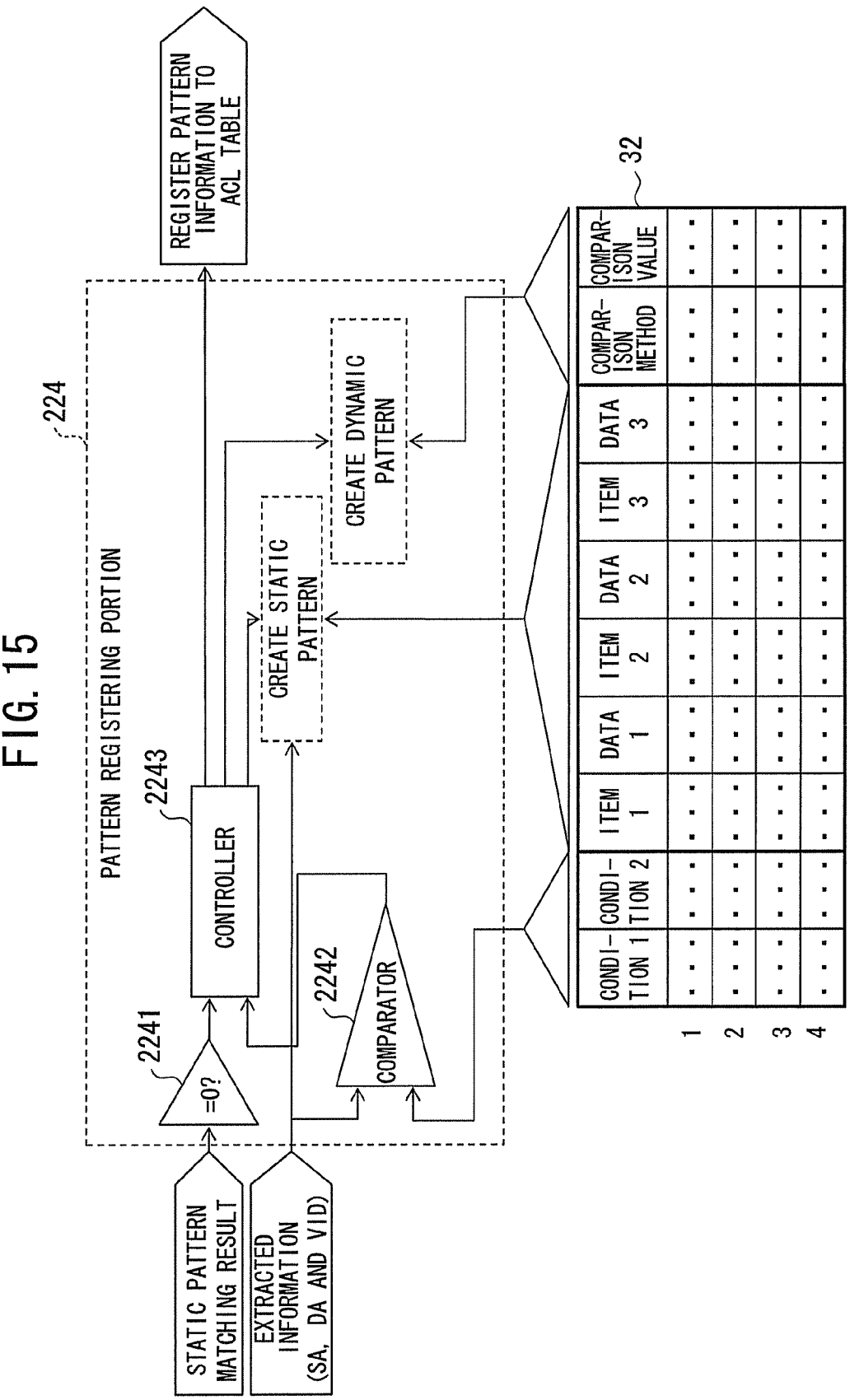
FIG. 15 is a diagram depicting configuration examples of the pattern registering portion and a registered definition table.

The details of S123 will further be described. FIG. 15 is a diagram depicting configuration examples of the pattern registering portion and registered definition table.

In FIG. 15, the registered definition table 32 has items of Condition 1, Condition 2, Items 1 to 3, Data 1 to 3, comparison methods, comparison values, and the like.

Each of Conditions 1 and 2 has a condition for registering new pattern information, which is defined on the basis of the value against the extracted information (which is a value of one of SV, DA and VID according to this embodiment). In other words, if the extracted information matches Conditions 1 and 2 of one record on the registered definition table 32, new pattern information is registered on the basis of the extracted information. Notably, the relationship between Condition 1 and Condition 2 may be AND or OR. The number of conditions is not limited to two. One condition or three or more conditions may be defined.

Items 1 to 3 hold numerical values indicating what kinds of values are to be registered with the items (which are first item to third item) included in a static pattern to be newly registered. For example, SA if the value is 0, DA if the value is 1, VID if the value is 2, the source IP address if the value is 3, or a mask for the source IP address if the value is 4 is to be registered therewith. According to this embodiment, the first, second and third items of the static pattern are compared with SA, DA and VID, respectively. Therefore, Item 1 has 0 (SA), Item 2 has 1 (DA) and Item 3 has 2 (VID).

Data 1 to 3 are paired with Items 1 to 3, respectively. Data 1 to 3 hold masks or immediates (or constants) to be applied to the values in the extracted information corresponding to the values designated in Items 1 to 3 (such as the value of DA of the extracted information if the value of Item 2 is "1").

For example, when the value of DA of the extracted information matching Conditions 1 and 2 is "01:23:45:67:89:alp" and when the value of Item 2, which is registered for Conditions 1 and 2, is "1", and the value of Data 2 is "ff:ff:ff:ff:ff:00", "01:23:45:67:89:00" as a result of the application of "ff:ff:ff:ff:ff:00" to "01:23:45:67:89:ab" as a mask is the value in the second item of the static pattern to be newly registered.

If the value of Item N (where N is one of 1 to 3) is 4, the value of Data N corresponding to the item is handled as a constant, and the value of Data N is directly handled as the value of the Nth item of the static pattern to be newly registered.

The comparison method and comparison value are the comparison method and comparison value to be registered with a dynamic pattern.

On the other hand, the pattern registering portion 224 using the registered definition table 32 has a comparator 2241, a comparator 2242 and a controller 2243, etc.

The comparator 2241 compares the static pattern matching results from all entries and 0. If all static pattern matching results are 0 (unmatched), the controller 2243 is started. This means that if the static pattern matching result of any one of the entries is 1 (matched), the controller 2243 is not started.

The comparator 2242 compares the extracted information and the conditions (which are Conditions 1 and 2) on the registered definition table 32 and inputs the line number (which is one of 1 to 4 in the example in FIG. 15) having the matching condition to the controller 2243. The processing by the comparator 2242 is performed in parallel with that by the comparator 2241.

The controller 2243 after started acquires the information on the line corresponding to the line number input by the comparator 2242 from the registered definition table 32, and, on the basis of the information, creates the static pattern and the dynamic pattern. More specifically, on the basis of Items 1 to 3 and Data 1 to 3 of the registered definition table 32, the static pattern is created. On the basis of the comparison method and comparison value on the registered definition table 32, the dynamic pattern is created. The controller 2243 registers the created pattern information (including the static pattern and dynamic pattern) with a vacant entry on the ACL table 31.

As described above, with the network equipment 10 of the second embodiment, pattern information can be dynamically added to the ACL table 31. This can further improve the flexibility of the filtering function. More specifically, packets, which have been difficult to capture before, can now be captured on the basis of the newly registered pattern information.

Figure 16:
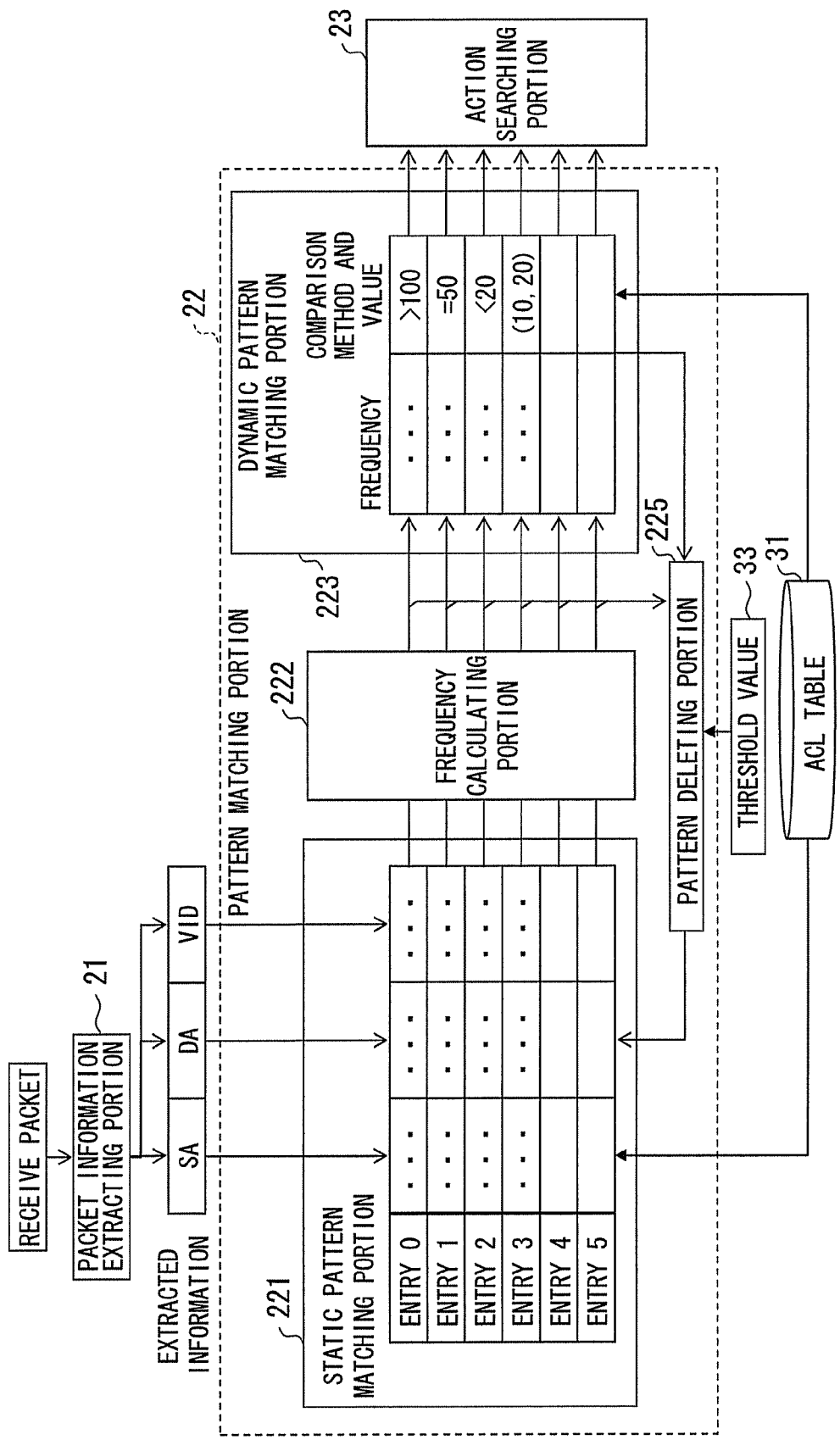
FIG. 16 is a diagram depicting a configuration example of a pattern matching portion according to a third embodiment.

Next, a third embodiment will be described. FIG. 16 is a diagram depicting a configuration example of a pattern matching portion according to the third embodiment. In FIG. 16, the same reference numerals are given to the same parts as those in FIG. 4 or FIG. 12, and the description thereon will be omitted herein. Though FIG. 16 does not depict the pattern registering portion 224 and registered definition table 32, the pattern registering portion 224 and registered definition table 32 may be included therein. The points which are not particularly referred according to the third embodiment may be similar to those in the first or second embodiment.

Referring to FIG. 16, the pattern matching portion 22 has a pattern deleting portion 225. The pattern deleting portion 225 deletes the pattern information the frequency of which is lower than a preset comparison (threshold) value 33 from the ACL table 31. The threshold value 33 is stored in the memory 30.

Figure 17:
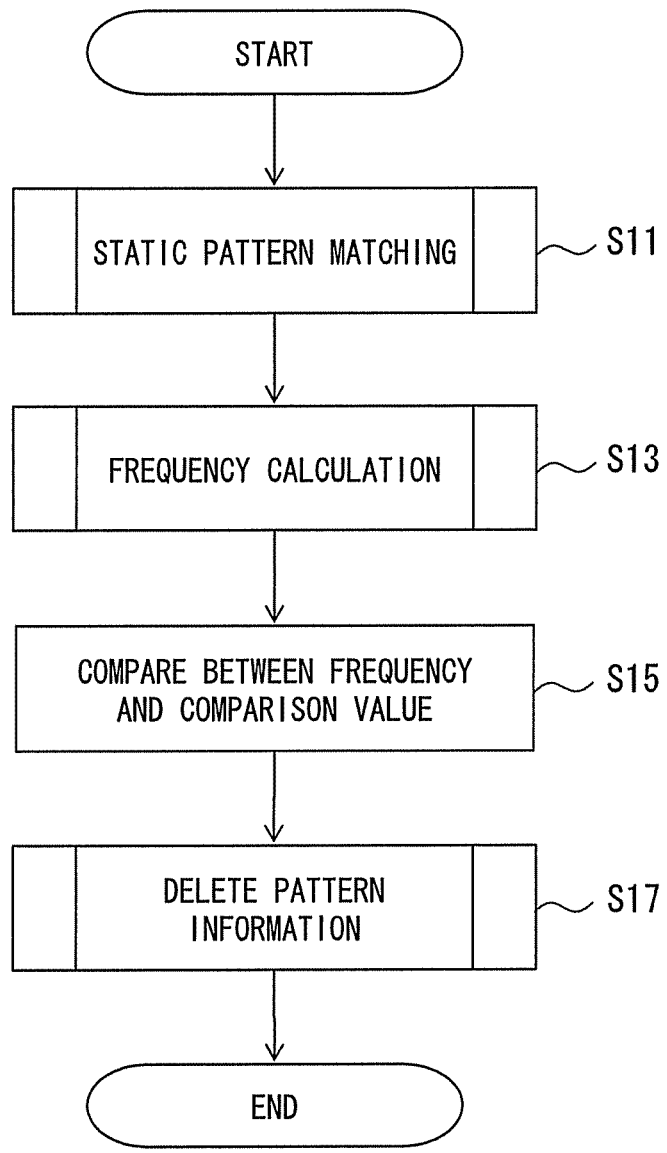
FIG. 17 is a flowchart for describing operations by the pattern matching portion according to the third embodiment.

FIG. 17 is a flowchart for describing operations by the pattern matching portion according to the third embodiment. In FIG. 17, the same operation numbers are given to the same operations as those in FIG. 5, and the description thereon will be omitted herein.

According to the third embodiment, S17 is added. In S17, the pattern deleting portion 225 performs processing of deleting the pattern information the frequency of which is lower than the threshold value 33 from the ACL table 31. Notably, S12 may be performed as in FIG. 13.

Figure 18:
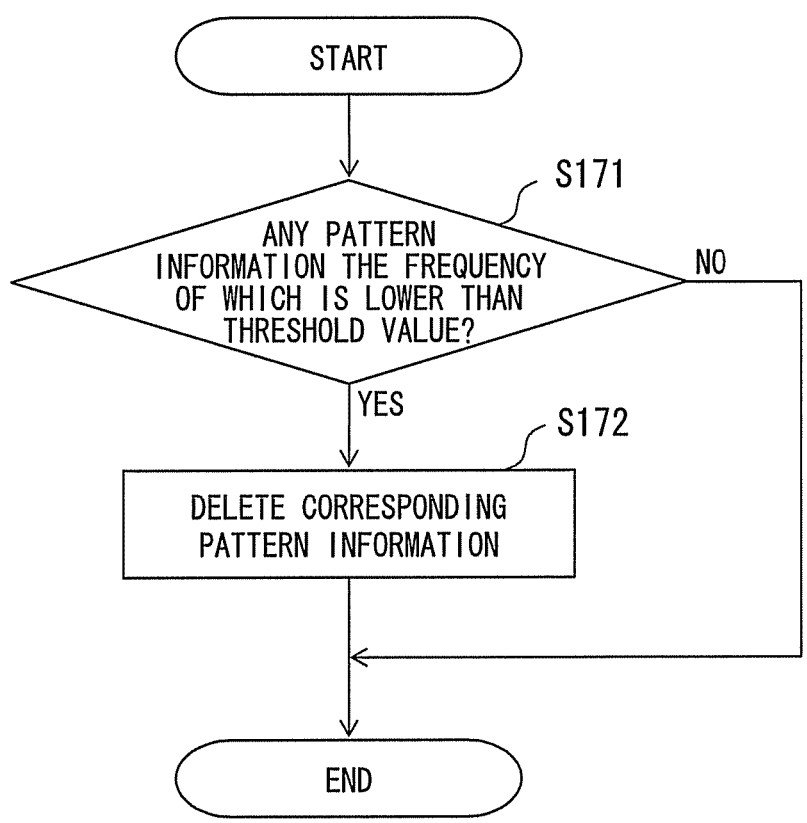
FIG. 18 is a flowchart for describing operations by a pattern deleting portion.

The details of S17 will be described. FIG. 18 is a flowchart for describing operations by the pattern deleting portion.

First of all, the frequency of the pattern information in the entries on the ACL table 31 and the threshold value 33 are compared, and the presence of the pattern information the frequency of which is lower than the threshold value 33 is determined (S171). Notably, the threshold value 33 may be common to the entries, or different values may be set for the entries.

If some pattern information the frequency of which is lower than the threshold value 33 exists (Yes in S171), the pattern information is deleted from the ACL table 31 (S172). Thus, the entry having had the pattern information becomes a vacant entry.

It might be disadvantageous that the pattern information the frequency of which is lower than the threshold value 33 is deleted unconditionally. For example, some pattern information may need to hold on the ACL table 31 typically, regardless of the value of the frequency. Accordingly, the ACL table 31 may be configured as follows, for example.

FIG. 19 is a diagram depicting a second configuration example of the ACL table. The ACL table 31 in FIG. 19 has items holding an automatic registration flag and an automatic deletion flag.

The automatic registration flag is flag information for indicating whether the corresponding pattern information is the pattern information automatically registered by the pattern registering portion 224 or not. For example, if the pattern registering portion 224 registers pattern information automatically, the value of the automatic registration flag is 1. At that time, the value of the automatic deletion flag may also be 1. On the other hand, preset pattern information has an automatic registration flag of 0. Alternatively, the automatic deletion flag of preset pattern information may be 0 or may be set by a user.

The automatic deletion flag is flag information for indicating whether the automatic deletion by the pattern deleting portion 225 is permitted or not. For example, if the value of the automatic deletion flag is 1, it indicates that the automatic deletion is permitted. If 0, it indicates that the automatic deletion is not permitted. Therefore, the pattern deleting portion 225 performs the processing in FIG. 18 on the entries having 1 as the value of the automatic deletion flag.

As described above, with the network equipment 10 according to the third embodiment, pattern information matching the extracted information and having a low frequency (that is pattern information which is not highly useful) can be deleted from the ACL table 31. Therefore, a vacant entry can be more properly reserved for registering more valid pattern information.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the network equipment 10, switching apparatus 20, etc.) can comprise a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A packet processing apparatus comprising:
a static pattern matching means for comparing two or more entries of pattern information, which pattern information entries are registered by a pattern information managing means for defining two or more filters for a received packet, with a value regarding at least a part of the received packet to output respective two or more static pattern matching results;
a frequency calculating means for performing two or more frequency of matching calculations in parallel for each of the pattern information entries according to a clock pulse within an arrival time period for the received packet, according to the respective two or more static pattern matching results, the frequency calculating means connecting in parallel with the static pattern matching means for each of the pattern information entries;

a dynamic pattern matching means for comparing, in parallel for each of the pattern information entries, a frequency of the entries of pattern information with a preset threshold value to output a comparison result, the dynamic pattern matching means connecting in parallel with the frequency calculating means for each of the pattern information entries; and a processing determining means for determining a processing on the received packet based upon the comparison result.

2. The packet processing apparatus according to claim 1, further comprising a pattern information registering means for creating new pattern information when the value regarding at least a part of the received packet not matching the pattern information entries and registers the new pattern information with the pattern information managing means.

3. The packet processing apparatus according to claim 2, wherein the pattern information registering means creates the new pattern information based upon the value regarding at least a part of the received packet matching a preset condition from among a plurality of received packets not matching the pattern information entries and registers the new pattern information with the pattern information managing means.

4. The packet processing apparatus according to claim 1, further comprising a pattern information deleting means for deleting the pattern information from the pattern information managing means based upon the comparison between the frequency for the two or more registered pattern information and the preset threshold value.

5. The packet processing apparatus according to claim 1, wherein the frequency calculating means adds 1 to a value of the frequency in accordance with the static pattern matching results by the static pattern matching means at predetermined periods of time and subtracts 1 from the value of the frequency with a lapse of the predetermined period.

6. The packet processing apparatus according to claim 5, wherein:
the frequency calculating means holds a maximum value of the calculated frequencies; and
the dynamic pattern matching means compares the maximum value and the preset threshold value.

7. The packet processing apparatus according to claim 1, wherein the frequency calculating means adds 1 to a value of the frequency in accordance with the static pattern matching results by the static pattern matching means at predetermined periods of time and changes the value of the frequency to 0 with a lapse of the predetermined period.

8. Network equipment comprising the packet processing apparatus according to claim 1.

9. A packet processing method, comprising:
connecting in parallel stored entries of a static pattern matching means for static pattern matching with a frequency calculating means for frequency matching calculation, which frequency calculating means is connected in parallel for entries of the static pattern matching means with a dynamic pattern matching means for dynamic pattern matching;
wherein the packet processing is by:
performing, by the static pattern matching means, static pattern matching by comparing two or more stored entries of pattern information defining two or more filters for a received packet with a value regarding at least a part of the received packet to output respective two or more static pattern matching results;
performing, by the frequency calculating means, two or more frequency of matching calculations in parallel for each of the pattern information entries according to a clock pulse within an arrival time period for the received packet, according to the respective two or more static pattern matching results, the frequency calculating means connecting in parallel with the static pattern matching means for each of the pattern information entries of the static pattern matching means;
performing, by the dynamic pattern matching means, dynamic pattern matching by comparing, in parallel for each of the pattern information entries, a frequency of entries of pattern information with a preset threshold value to output a comparison result, the dynamic pattern matching means connecting in parallel with the frequency calculating means for each of the pattern information entries of the static pattern matching means; and
determining processing on the received packet based upon the dynamic pattern matching.

10. The packet processing method according to claim 9, further comprising creating new pattern information based upon the value regarding at least a part of the received packet not matching the pattern information entries and registering the new pattern information with a pattern information managing means for registration of pattern information.

11. The packet processing method according to claim 10, wherein the pattern information registering creates the new pattern information based upon the value regarding at least a part of the received packet matching a preset condition from among a plurality of received packets not matching the pattern information entries and registers the new pattern information by storing the new pattern information with the pattern information managing means.

12. The packet processing method according to claim 9, further comprising deleting the stored pattern information based upon a comparison between the frequency for the two or more registered pattern information and the preset threshold value.

13. The packet processing method according to claim 9, wherein the frequency calculating adds 1 to a value of the frequency in accordance with the static pattern matching results at predetermined periods of time and subtracts 1 from the value of the frequency with a lapse of the predetermined period.

14. The packet processing method according to claim 9, wherein the frequency calculating adds 1 to a value of the frequency in accordance with the static pattern matching results at predetermined periods of time and changes the value of the frequency to 0 with a lapse of the predetermined period.

15. The packet processing method according to claim 13, wherein:
the frequency calculating holds a maximum value of the calculated frequencies; and
the dynamic pattern matching compares the maximum value and the preset threshold value.

* * * * *